United States Patent

Böhmler

Patent Number: 5,664,807
Date of Patent: Sep. 9, 1997

[54] FORCE LIMITATION IN A VEHICLE OCCUPANT RESTRAINING SYSTEM

[75] Inventor: Klaus Böhmler, Schwäbisch Gmünd, Germany

[73] Assignee: TRW Occupant Restraint Systems GmbH, Alfdorf, Germany

[21] Appl. No.: 616,088

[22] Filed: Mar. 15, 1996

[30] Foreign Application Priority Data

Mar. 29, 1995 [DE] Germany .................. 19 511 457.4

[51] Int. Cl.⁶ .................. B60R 22/78; B60R 22/00
[52] U.S. Cl. .................. 280/805
[58] Field of Search .................. 280/777, 805, 280/806

[56] References Cited

U.S. PATENT DOCUMENTS

| | | | |
|---|---|---|---|
| 3,632,060 | 1/1972 | Balder | 242/379.1 |
| 4,027,905 | 6/1977 | Shimogawa et al. | 297/472 |
| 4,886,295 | 12/1989 | Browne | 280/777 |
| 4,978,132 | 12/1990 | Wilson et al. | 280/47.131 |
| 4,978,139 | 12/1990 | Andres et al. | 280/805 |
| 5,320,385 | 6/1994 | Schmid et al. | 280/805 |
| 5,338,065 | 8/1994 | Fohl | 280/806 |
| 5,340,046 | 8/1994 | Schroth et al. | 280/805 |
| 5,487,562 | 1/1996 | Hedderly et al. | 280/777 |

FOREIGN PATENT DOCUMENTS

| | | |
|---|---|---|
| 0404075 | 12/1990 | European Pat. Off. . |
| 0540921 | 5/1993 | European Pat. Off. . |
| 1812864 | 8/1970 | Germany . |
| 2314022 | 10/1974 | Germany . |
| 2344308 | 3/1975 | Germany . |
| 2727470 | 1/1979 | Germany . |
| 3842791 | 6/1990 | Germany . |
| 19517440 | 11/1995 | Germany . |

*Primary Examiner*—Kenneth R. Rice
*Attorney, Agent, or Firm*—Tarolli, Sundheim, Covell, Tummino & Szabo

[57] ABSTRACT

In a restraining system with a safety belt and an inflatable restraining device the restraining force exerted by the belt on the occupant is limited by a force limiter to a level, which is adjustable and can be adapted to the body size and weight of the vehicle occupant. The adjustment of the force level is performed in such a manner that a characteristic of force versus forward displacement of the vehicle occupant in the event of a vehicle impact has a section of a falling tendency from a point at which contact between the belt webbing and the inflated restraining device is expected to occur.

27 Claims, 5 Drawing Sheets

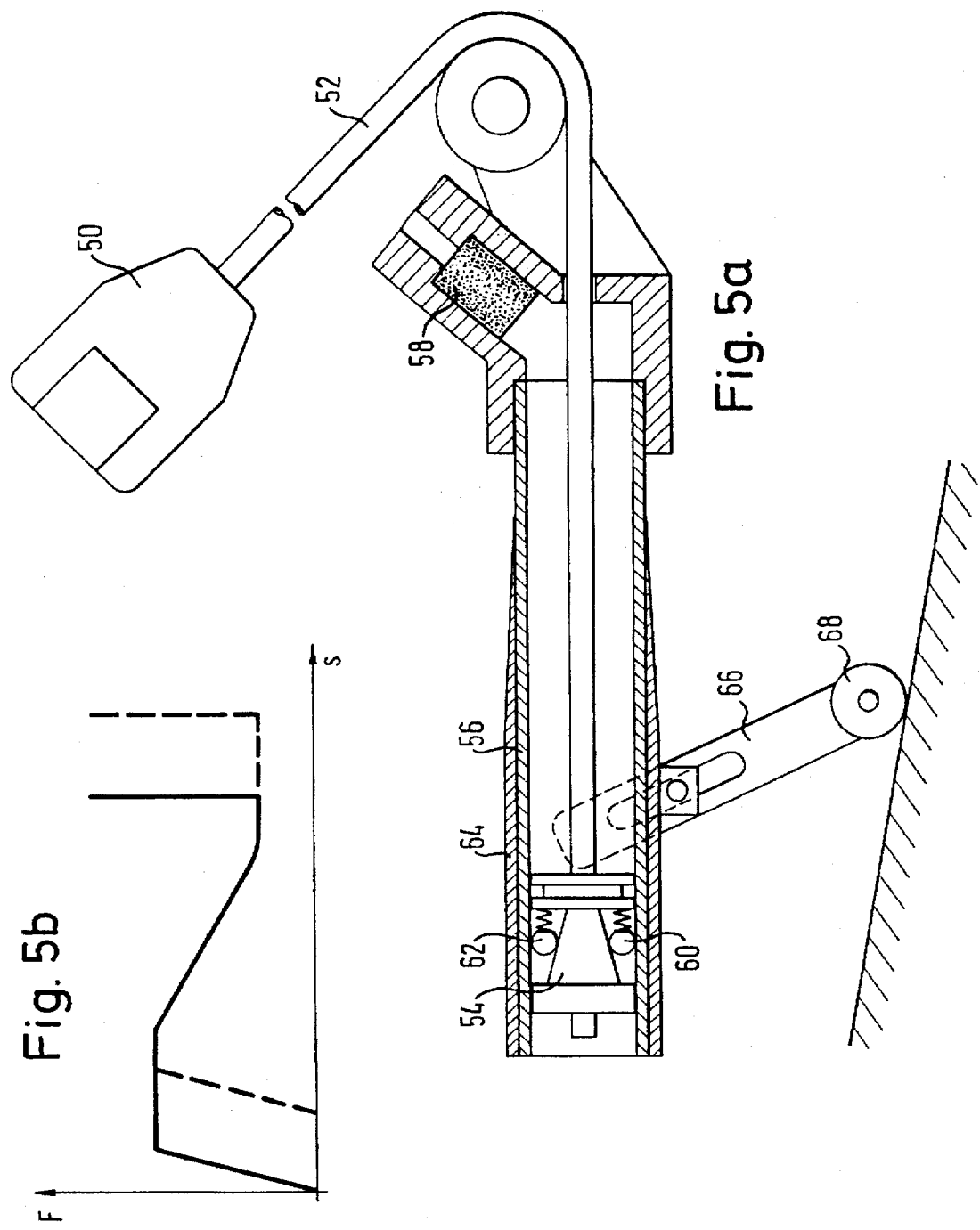

FORCE LIMITATION IN A VEHICLE OCCUPANT RESTRAINING SYSTEM

The invention relates to a method for limiting the force exerted on a vehicle occupant by a safety belt in an occupant restraining system in the event of a vehicle impact, and to a force limiter, with which the method may be performed.

In the course of a restraining process force peaks occur in the belt webbing which increase the risk of injury. Therefore force limiters have been developed which are arranged in the path of force flow in the belt system and smooth out force peaks by plastic deformation of material.

Optimum protection of an occupant may be achieved by combined use of a safety belt and an inflatable restraining element (or airbag). In the case of such a combined restraining system after a certain forward displacement of the occupant there will be contact between the belt and the inflated restraining element. It has now been found that at the latest from the occurrence of such contact and thereafter the characteristic, which represents the force as a function of the forward displacement, should possess a decreasing tendency so that the restraining force applied by the belt is reduced.

In the case of conventional force limiters the characteristic of the force is set at a fixed value along the forward displacement path by the design of the equipment. Dependent on the size and/or weight of the occupant's body a different form of such characteristic would however be desirable for minimum risk of injury.

The present invention provides a method of limiting the restraining force acting on the occupant in an occupant restraining system in the event of a vehicle impact, which renders possible an optimization of the characteristic representing the force as a function of the forward displacement. In accordance with the invention a parameter is derived from the occupant representing his body size and/or weight and the level of force limitation is set in a fashion dependent on such parameter. For a smaller body size or a lower weight of the occupant a lower force level is set than for larger or heavier persons so that independently of the features of the body of the occupant the full forward displacement path of the force limiter is always available.

In the case of a restraining system which is combined with an inflatable restraining element the setting of the force level is performed in accordance with the invention in such a manner that in the characteristic representing the force as a function of the forward displacement in a section of the path, after the completion of which contact between the belt webbing and the inflated restraining element is expected to occur, the characteristic possesses a decreasing tendency.

Further advantageous developments and convenient forms of the invention will be understood from the following detailed descriptive disclosure of several embodiments thereof in conjunction with the accompanying drawings.

FIG. 5a shows a fourth working embodiment of a force limiter.

FIG. 5b shows the characteristic thereof.

Figure 6A:
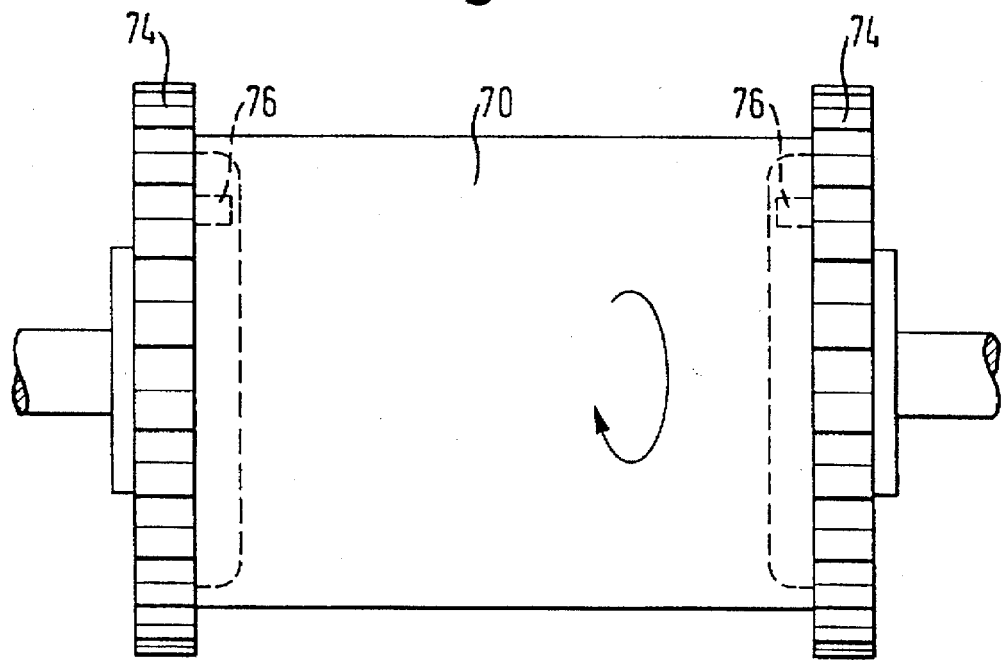

FIG. 6a diagrammatically illustrates a drum shaft of a belt retractor with an integrated force limiter in accordance with a fifth embodiment of the invention.

Figure 6B:
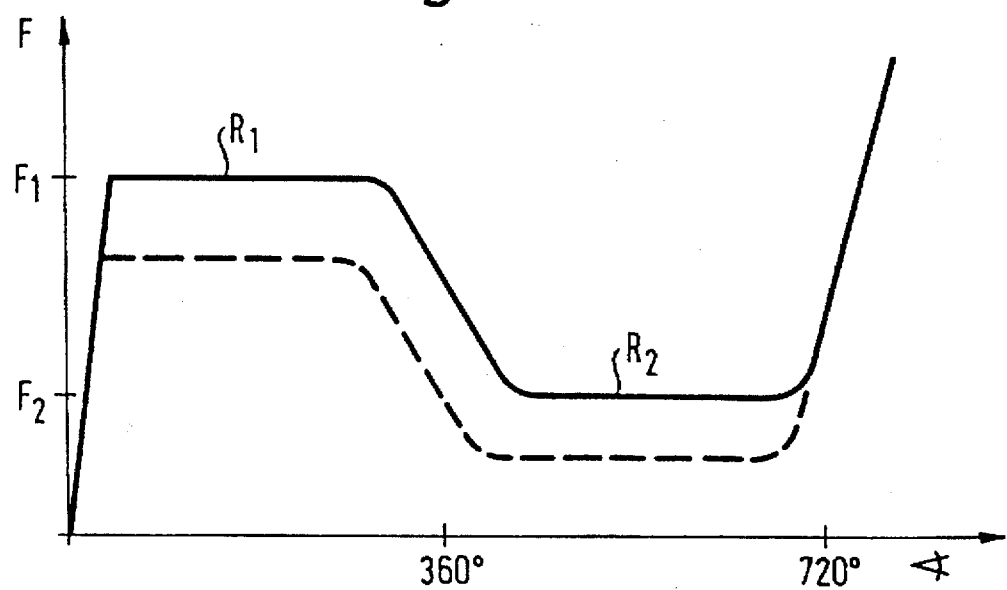
Figure 6C:
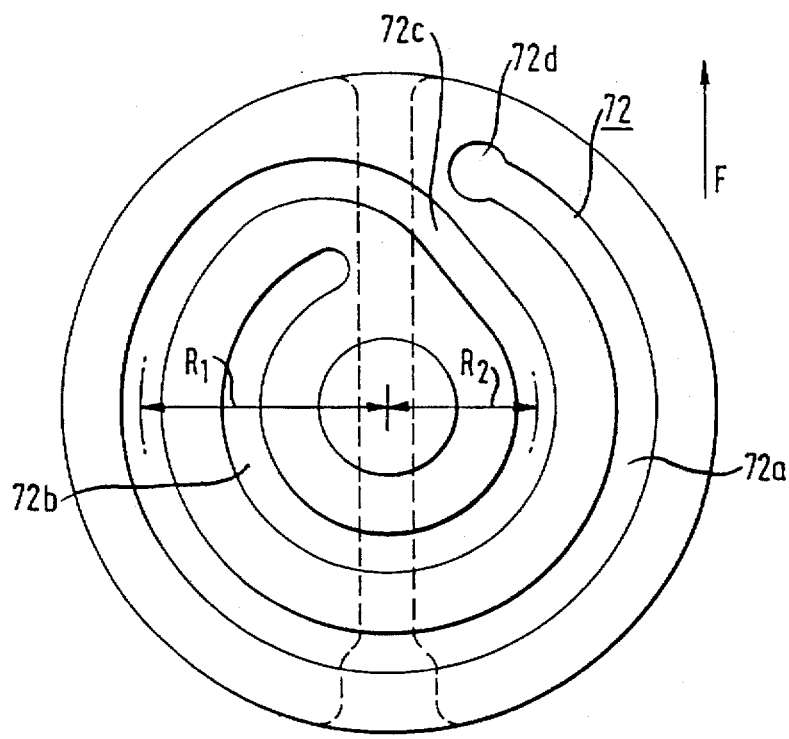

FIG. 6b shows the respective characteristic.

FIGS. 6c to 6f show details of this working embodiment of the force limiter.

Figure 1:
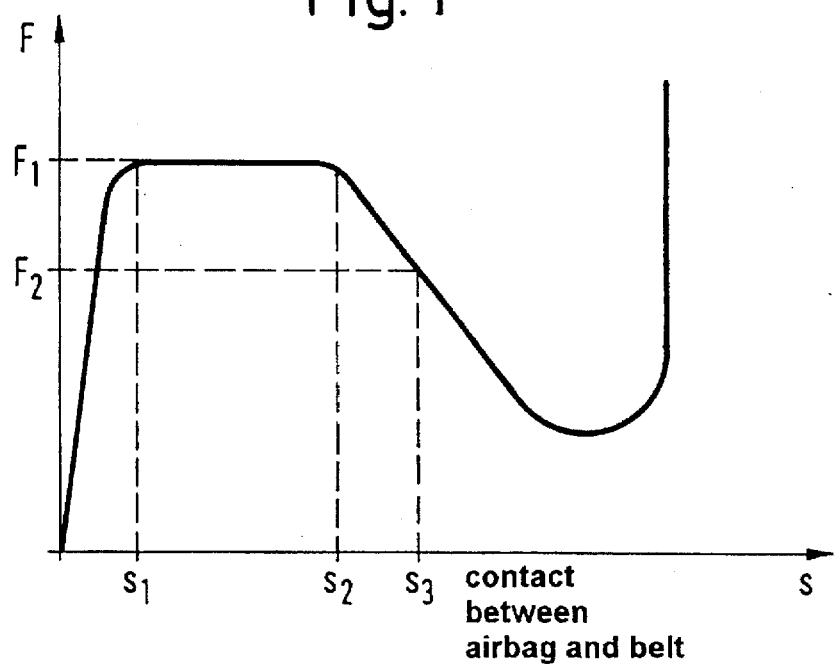
FIG. 1 is a graph of a characteristic representative of the force as a function of the forward displacement path.

In the course of forward displacement of an occupant wearing a belt the belt force F will initially increase steeply, but after a short displacement $s_1$ is limited to a value $F_1$ by a force limiter operating on the basis of plastic material deformation. In the ideal case the force will remain at this value $F_1$ for a long path part. In a restraining system, which in addition to the belt possesses an inflatable restraining element (airbag), after a certain forward displacement the belt will engage the inflated restraining element. At this point in time, which corresponds to a path part $s_3$ in the graph of FIG. 1, the characteristic should possess a distinctly downwardly sloping tendency so that the sum of the belt force and the supporting force due to the inflated restraining element does not assume an excessive value. Even prior to reaching the path part $s_3$, i.e. at $s_2$, the characteristic consequently passes into a downwardly sloping part.

However, for large or heavy persons a greater force level will be desired than for smaller or lighter persons. In the case of known force limiters such a behavior can not be produced.

Figure 2A:
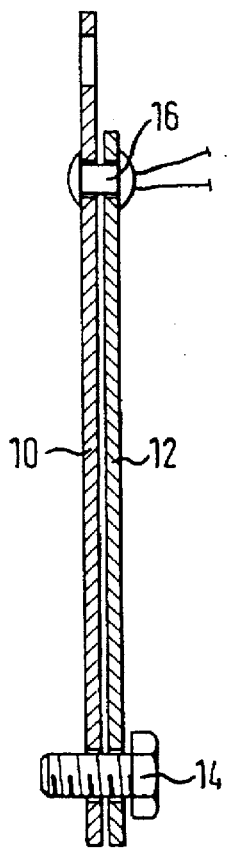
FIG. 2a shows a first working embodiment of a force limiter.
Figure 2B:
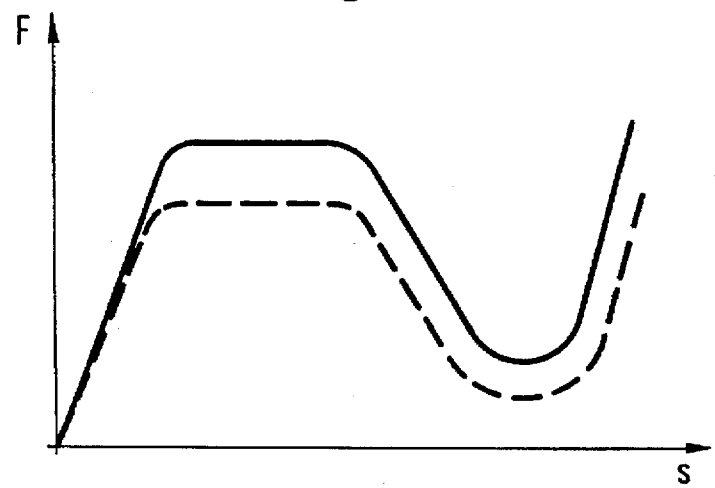
FIG. 2b shows the characteristic thereof.

In the embodiment depicted in FIG. 2a a force limiter has two fitting parts 10 and 12, which may be extended with plastic deformation of their material and are arranged so that they are functionally connected in parallel. The fitting parts 10, 12 are coupled at one end by an attachment pin 14, and at the opposite end by a pyrotechnic rivet 16. The pyrotechnic rivet 16 possesses an electrical fuse and may be fired by the application of an electrical pulse to two leads. The fitting part 12 is then uncoupled from the fitting part 10. The operation of the pyrotechnic rivet 16 takes place selectively in the course of a crash in a fashion dependent on the weight or size of the vehicle occupant. In the case of a low weight and/or a small size merely the fitting part 10 is to be effective as a force limiting means. This results in the characteristic marked in broken lines in FIG. 2b, which is at a lower level than the characteristic in a continuous line, which corresponds to the parallel arrangement of the two fitting parts 10 and 12.

Figure 3A:
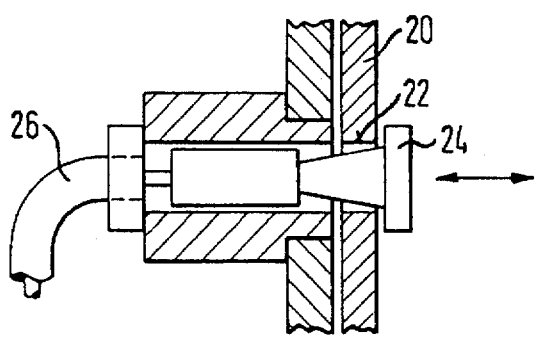
FIG. 3a shows a second working embodiment of a force limiter.
Figure 3B:
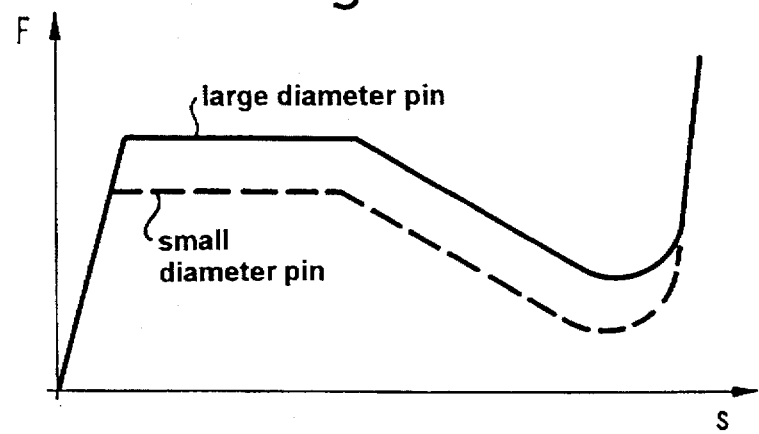
FIG. 3b shows the characteristic thereof.

In the embodiment depicted in FIG. 3 a fitting part 20, placed in the force path of the belt system, is provided with a slot 22 into which an adjustable pin 24 fits. The pin 24 possesses a shank varying in diameter. In the illustrated working embodiment of the invention such shank is conical. By displacement of the pin 24, for example by means of a cable 26 coupled with the driver's seat, the external diameter of the pin is changed which is effective for fitting into the slot 22 and the material of the fitting part 20 will be plastically deformed. FIG. 3b diagrammatically shows two characteristics which may be produced in this manner.

Figure 4B:
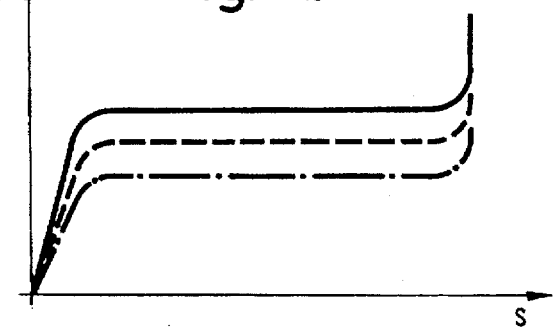
FIG. 4b shows the characteristic thereof.
Figure 4A:
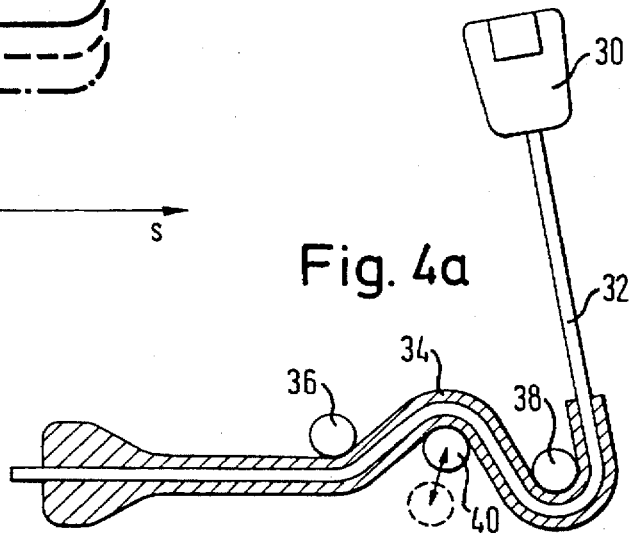
FIG. 4a shows a third working embodiment of a force limiter.

In the case of the embodiment illustrated in FIG. 4a a belt buckle 30 is anchored by means of a cable 32, which possesses a casing 34 of aluminum, to the vehicle body. The casing 34 is curved and deflected by three pins 36, 38 and 40. The pins 36 and 38 are rigidly fixed to the vehicle body, whereas the pin 40 may be set so that it causes a greater or less curvature of the bent part of the casing 34. The setting of the position of the pin 40 may also be performed with the setting of the seat position in the case of this embodiment. Dependent on the setting of the pin 40 there will be one of the characteristics shown in FIG. 4b.

In the embodiment of FIG. 5a a belt buckle 50 is connected via a cable 52 with the piston 54 of a piston and cylinder unit, whose cylinder 56 is connected with a pyrotechnic gas generator 58. The piston 54 possesses a conical section, on which two roller elements 60 and 62 bear, which engage the inner wall surface of the cylinder 56. FIG. 5a shows the piston and cylinder unit after operation of the gas generator 58 to tighten the belt webbing. From this position rearward movement of the piston 54 may only take place when the cylinder wall is plastically deformed by the roller elements 60 and 62. The resistance to deformation of the cylinder wall is varied by a sleeve 64 slipped onto same having a variable wall thickness over its length. A two armed lever 66 engages the sleeve 64 and is pivotally mounted, its end remote from the sleeve 64 bearing a wheel 68 running on a ramp on the floor of the vehicle. Since the piston and cylinder unit illustrated in FIG. 5a is mounted with the belt buckle 50 on a vehicle seat, the overall arrangement is entrained on displacement of the vehicle seat with the result that the slope of the lever 66 is changed and accordingly the longitudinal position of the sleeve 64 on the cylinder wall is also changed. FIG. 5b shows by way of example two characteristics resulting from setting of the sleeve 64.

In the embodiment of FIG. 6 the belt spool 70 of a belt retractor is provided at its two end surfaces with a convolute groove 72. Two ratchet wheels 74 mounted on the end surfaces of the belt spool 70 are each coupled with the belt spool 70 by means of a pin 76, which on the one hand fits into the groove 72 and on the other hand runs in an oblique groove 78 in the inner side of the ratchet wheels 74. The groove 72 has an outer, part-circular section 72a, an inner, also part-circular section 72b and an intermediate section 72c, which interconnects the sections 72a and 72b. At the start the pins 75 are located at the outer end 72d of the groove.

In the locked condition of the belt retractor the ratchet wheels 74 are held on the frame of the retractor in a manner preventing rotation. When a high torque is exerted via the belt webbing on the belt spool 70, the belt spool 70 will be rotated in relation to the ratchet wheels 74, the pins 76 the extending into the groove 72 and the lateral walls of the groove 72 being plastically deformed, since the pin 76 is wider than the groove 72. On the outer section 72a of the groove there is a radius $R_1$, which leads to the substantially constant force level $F_1$ in the graph of FIG. 6b. After approximately one complete revolution of the belt spool 70 the pins 75 will respectively fit into the intermediate section 72c of the groove 72 so that now, owing to the progressively increasing effective leverage, with which the force F engages the periphery of the belt spool 70, there will be a downwardly sloping part of the characteristic in FIG. 6b. The inward movement of the pins 76 is rendered possible by the radial component of the groove 78. As soon as the internal section 72b of the groove 72 with the radius $R_2$ is reached, the force will be limited to a lower level $F_2$ in the characteristic in accordance with FIG. 6b.

Figure 6E:
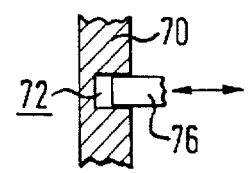

FIG. 6e diagrammatically indicates that the depth of penetration of the pins 76 into the groove 72 may be adjusted. The adjustment may for instance be performed in a fashion dependent on the height the belt webbing still coiled on the belt spool 70, since such measure indirectly provides information about the size of the vehicle occupant. Dependent on the depth of penetration of the pins 76 into the groove 72 there will be greater or smaller values for the forces $F_1$ and $F_2$, as shown in FIG. 6b by a broken line.

Figure 6F:
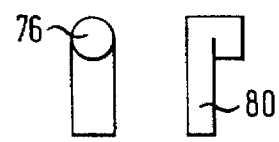
Figure 6D:
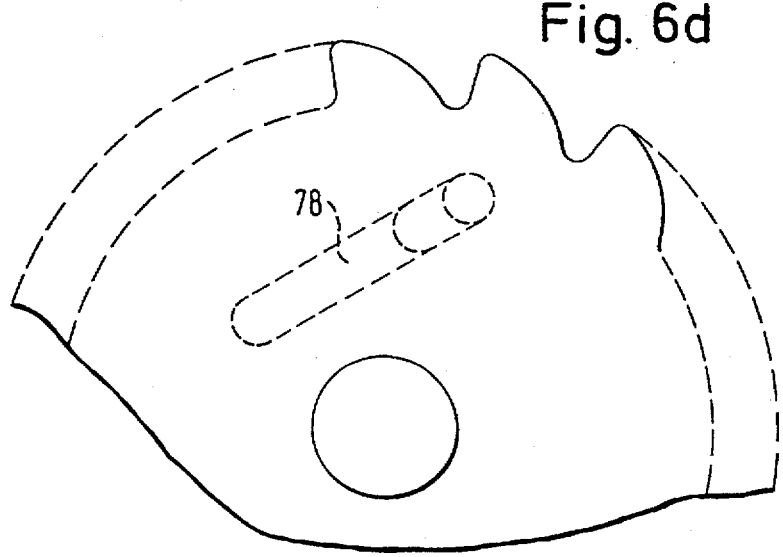

As lastly will be seen from the FIG. 6f, the pins 76 are provided with an angled elongated guide runner 80 to serve for reliable location of the pins.

What is claimed is:

1. In a vehicle occupant restraint system comprising a safety belt and a force limiter inserted into a path of force flow between said belt and a vehicle bodywork, said force limiter having an adjustable characteristic of force versus path for setting a level of force limitation to a desired value, the method comprising the steps of
   a) determination of a parameter representative of at least one of the vehicle occupant properties including weight and size, and
   b) adjusting the level of force limitation as a function of said parameter.

2. In a vehicle occupant restraint system comprising an inflatable airbag, a safety belt and a force limiter inserted into a path of force flow between said belt and a vehicle bodywork, said force limiter having an adjustable characteristic of force versus path, the method comprising the steps of
   a) determination of a section in said characteristic where contact between the safety belt fastened around a vehicle occupant and an inflated airbag is expected to occur during forward movement of said occupant in the vehicle in the event of a vehicle impact, and
   b) adjusting the characteristic of force versus path so that force decreases with increasing path within said section of the characteristic.

3. A force limiter for use in a vehicle occupant restraint system comprising a safety belt and a force limiter inserted into a path of force flow between said belt and a vehicle bodywork, said force limiter having an adjustable characteristic of force versus path for setting a level of force limitation to a desired value.

4. The force limiter of claim 3, wherein said level of force limitation is adjusted as a function of a parameter representative of at least one of the vehicle occupant properties including weight and size.

5. The force limiter of claim 4, comprising a plastically deformable member in said path of force flow and means for varying a degree of plastic deformation of said member as a function of said parameter.

6. The force limiter of claim 4, comprising a plurality of plastically deformable members connected in parallel in said path of force flow and disconnecting means for selectively disconnecting at least one of said members as a function of said parameter.

7. The force limiter of claim 3, comprising a pair of elongate plastically deformable fittings, a first one of said fittings having a longitudinally extending slot and a second one of said fittings carrying a bolt member which has a shank with an outer diameter which varies over the length of the shank, and said shank penetrating to a controllable depth into said slot.

8. The force limiter of claim 3, comprising a pair of elongate plastically deformable fittings, a first one of said fittings having a longitudinally extending groove and a second one of said fittings carrying a pin member, said pin member penetrating to a controllable depth into said groove.

9. The force limiter of claim 3, comprising an elongate plastically deformable member with a curved section guided between at least three deflection members, one of said deflection members being movable in relation to the remaining deflection members to vary the degree of curvature of said curved section.

10. The force limiter of claim 3, comprising a piston and cylinder unit with a piston carrying at least one deforming member engaging the inner wall surface of the cylinder, and an outer tube member fitted over said cylinder and having a wall of a thickness varying over its length, said outer tube member being slidably mounted on said cylinder.

11. The force limiter of claim 3, comprising a belt retractor with a spool rotatably mounted in a frame, said spool having at least one side face wherein a convolute groove is formed, and at least one ratchet wheel carrying a pin which penetrates into said groove to a controllable depth.

12. The force limiter of claim 11, wherein said groove has a first, outer and approximately part-circular section, a second, inner approximately part-circular section and a third section interconnecting said first and second sections.

13. A seat belt webbing retractor comprising:

a spool member around which seat belt webbing is wound, said spool member being supported for rotation in webbing withdrawal and webbing retraction directions;

a ratchet wheel member rotatable with said spool member in the webbing withdrawal and webbing retraction directions;

blocking means for preventing rotation of said ratchet wheel member and said spool member in the webbing withdrawal direction; and means for dissipating energy and for permitting said spool member to rotate in the webbing withdrawal direction relative to said ratchet wheel member in response to a webbing withdrawal force above a predetermined amount when said ratchet wheel member is prevented from rotating by said blocking means, said energy dissipating means including a part which deforms a portion of one of said members.

14. A retractor as set forth in claim 13, wherein said portion of one of said member which is deformed is on said spool member.

15. A retractor as set forth in claim 14, wherein said portion on said spool member which is deformed defines a groove.

16. A retractor as set forth in claim 15, wherein said part of said means for dissipating energy which deforms a portion of said spool member includes a projection which extends into said groove.

17. A retractor as set forth in claim 14, wherein said groove on said spool member has a general spiral shape.

18. A retractor as set forth in claim 14, wherein said groove extends around a rotational axis of said spool member.

19. A retractor as set forth in claim 18, wherein said groove has a first segment located at a first radius from said axis and a second segment located at a second, different radius from said axis.

20. A seat belt webbing retractor comprising:

a rotatable spool member around which seat belt webbing is wound;

a rotatable ratchet wheel member;

a blocking means engageable with said ratchet wheel member to block rotation of said ratchet wheel member; and an element extending to engage said ratchet wheel member and said spool member for holding said members against rotation relative to each other until an application of force above a threshold amount to said spool member by the webbing, said element having surface means for deforming a portion of one of said members to enable said spool member to rotate relative to said ratchet wheel member upon an application of force above the threshold amount to said spool member by the webbing when said blocking means is in engagement with said ratchet wheel member.

21. A retractor as set forth in claim 20, wherein said portion which is deformed is on said spool member and defines an elongate groove in said spool member extending about a rotation axis of said spool member.

22. A retractor as set forth in claim 21, wherein said ratchet wheel member has an oblique groove, said element moves along said oblique groove during deformation of said portion of said spool member.

23. A seat belt webbing retractor comprising:

a spool around which seat belt webbing is wound, said spool being supported for rotation in webbing withdrawal and webbing retraction directions;

a member rotatable with said spool;

means for preventing rotation of said spool and said member in the webbing withdrawal direction;

means for permitting said spool to rotate relative to said member and limiting the force in the seat belt webbing, including a groove in one of said spool and said member and an element extending into said groove for deforming said one of said spool and said member during rotation of said spool relative to said member; and means for adjusting the amount of deformation of said one of said spool and said member by said element.

24. A retractor as set forth in claim 23, wherein said means for adjusting includes means for changing the amount of the extent of said element into said groove.

25. A retractor as set forth in claim 23, wherein said groove extends around a rotational axis of said spool and said member.

26. A retractor as set forth in claim 25, wherein said groove has a first segment located at a first radius from said axis and a second segment located at a second, different radius from said axis.

27. A retractor as set forth in claim 25, wherein said means for adjusting includes means for moving said element parallel to said axis relative to said one of said spool and said member.

* * * * *